United States Patent
Yu (10) Patent No.: US 9,121,410 B2
(45) Date of Patent: Sep. 1, 2015

(54) OSCILLATING FAN WITH BUILT-IN PULL-TYPE CONTROL SWITCH

(76) Inventor: Steven Yu, Los Angeles, CA (US)

( * ) Notice: Subject to any disclaimer, the term of this patent is extended or adjusted under 35 U.S.C. 154(b) by 516 days.

(21) Appl. No.: 13/479,231

(22) Filed: May 23, 2012

(65) Prior Publication Data

US 2013/0315754 A1     Nov. 28, 2013

(51) Int. Cl.
*F04D 25/10* (2006.01)
*F04D 25/06* (2006.01)

(52) U.S. Cl.
CPC .......... *F04D 25/0693* (2013.01); *F04D 25/105* (2013.01)

(58) Field of Classification Search
CPC ... F04D 19/002; F04D 19/005; F04D 25/105; F04D 29/403; F04D 29/626; F04D 29/4226; F04D 29/4233; F04D 29/424; F04D 29/4246; F04D 29/4253
USPC ............................................. 417/359, 410.1
See application file for complete search history.

(56) References Cited

U.S. PATENT DOCUMENTS

| | | | | |
|---|---|---|---|---|
| 2,735,611 | A * | 2/1956 | McLean | 417/362 |
| 3,625,633 | A * | 12/1971 | Nelson | 416/169 R |
| 4,867,647 | A * | 9/1989 | Chow | 417/423.7 |
| 5,421,701 | A * | 6/1995 | Funston | 416/5 |
| 6,887,049 | B2 * | 5/2005 | Chen | 417/423.7 |
| 7,594,798 | B1 * | 9/2009 | Bucher et al. | 416/100 |
| 7,839,038 | B2 * | 11/2010 | Simofi-Ilyes et al. | 310/89 |
| 2011/0002784 | A1 * | 1/2011 | Yu | 416/100 |

* cited by examiner

*Primary Examiner* — Bryan Lettman
*Assistant Examiner* — Charles W Nichols
(74) *Attorney, Agent, or Firm* — Rabin & Berdo, P.C.

(57) ABSTRACT

An oscillating fan with built-in pull-type control switch includes a housing defining a receiving space having a front open end; a driving motor mounted to the front open end of the receiving space and having a first rotary shaft; a blade assembly mounted to the first rotary shaft; at least one pull switch having a selector mounted in the housing and an actuator extended through and located outside the housing; and a control box provided in the receiving space to electrically connect to the driving motor and every pull switch. The actuator includes a pull string having an end connected to the selector and another end hung from the housing by a predetermined length, allowing a user to control the oscillation of the fan via the pull string. Since most fan components are integrated in the housing, the fan occupies only reduced space and is more practical for use.

7 Claims, 7 Drawing Sheets

OSCILLATING FAN WITH BUILT-IN PULL-TYPE CONTROL SWITCH

FIELD OF THE INVENTION

The present invention relates to an oscillating fan with built-in mechanical-type pull mechanism, and more particularly to an oscillating fan having a pull switch downward hanging by a predetermined length, so that a user may conveniently control the rotational speed, the air volume, the oscillation, the timer or other settings of the fan simply via the pull switch.

BACKGROUND OF THE INVENTION

The currently available fans generally have two functions, namely, oscillating while blowing and providing variable rotational speeds. The oscillation of a fan is generally controlled via a pull bar provided on an upper side of a motor housing of the fan. That is, by pulling or pushing the pull bar relative to the motor housing, a user may enable or stop the fan to or from oscillating. However, the fan is not always positioned on a floor for use. In the actual use of a fan, it is often necessary to change the position for placing the fan due to a relatively small space available for use or due to a particular purpose of use. Therefore, wall fans have been developed for mounting on a wall.

A conventional wall fan usually includes a control box provided on a lower side of a main body of the fan. Two pull strings are connected to the control box. One of the two pull strings is used to control an oscillating selector, and the other one is used to control a rotational speed selector. A disadvantage of the conventional wall fan is the control box that occupies additional space. To avoid undesired waste of space while maintaining the control function via the pull strings, it is necessary to improve the currently available oscillating fan.

SUMMARY OF THE INVENTION

A primary object of the present invention is to provide an oscillating fan with built-in pull-type control switch and having many components of the fan, such as a control switch, a driving motor, a control box, and an oscillating mechanism, integrated in a housing of the fan, so that the fan can have a reduced overall volume and effectively increased usability.

Another object of the present invention is to provide an oscillating fan having a pull-type control switch hung from a housing of the fan by a predetermined length, so that a user may conveniently pull the control switch to control the rotational speed, the air volume, the oscillation, the timer or other different settings of the fan even when the fan is mounted to a wall, a ceiling, or other high positions that are difficult to reach simply with a hand, making the fan very convenient for use.

To achieve the above and other objects, the oscillating fan with built-in pull-type control switch according to the present invention includes a housing, a driving motor, a rotary blade assembly, at least one pull switch, and a control box. The housing defines an inner receiving space having a front open end. The driving motor is fixedly mounted to the front open end of the receiving space and has a first rotary shaft. The rotary blade assembly is mounted to the first rotary shaft. The at least one pull switch has a selector and an actuator extended through and hung from the housing by a predetermined length. The control box is provided in the receiving space of the housing to electrically connect to the driving motor and every pull switch.

In a preferred embodiment of the present invention, a partial volume of a front end of the driving motor and the first rotary shaft are located outside and in front of the front open end of the housing. Further, a plurality of fixing arms is radially outward extended from the front end of the driving motor for a fan hood to assemble thereto; and the fan hood encloses the whole rotary blade assembly therein to protect the same.

Further, the actuator has a round hollow post fixedly attached to an outer side of the housing, and a pull string having an end extended through the round hollow post into the housing to connect to the selector. The actuator cooperates with the selector to limitedly move between a stable position and a switching position to thereby form a controlling and switching means.

The oscillating fan with built-in pull-type control switch further includes an oscillating mechanism, which is provided inside the housing and has a driving end connected to the driving motor and an oscillating end driven by the driving end to oscillate. The driving end includes a pivot motor that is connected to a rear end of the driving motor and has a second rotary shaft extended therefrom. The oscillating end includes a pivoting member connected to an underside of the driving motor and an interconnecting member connected to between the pivoting member and the second rotary shaft. The pivoting member includes a fixing shaft and a movable shaft connected to the driving motor and rotatably received in the fixing shaft, and the interconnecting member includes a pivoting block connected to the second rotary shaft and an oscillating plate connected to between the pivoting block and the fixing shaft, so as to define a reciprocatingly oscillating motion path for the fan.

The present invention is characterized in using an actuator in the form of a pull string to start the pivot motor, and using the pivot motor, the pivoting member and the interconnecting member as the mechanism for controlling the oscillating fan to reciprocatingly oscillate, making the oscillating fan more convenient to control.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof and with reference to the accompanying drawings. For the purpose of easy to understand, like elements in the preferred embodiment are denoted by the same reference numerals.

Please refer to FIGS. 1 to 5, in which an oscillating fan with built-in pull-type control switch according to a preferred embodiment of the present invention is shown. As shown, the oscillating fan includes a housing 30, a driving motor 41, a rotary blade assembly 50, at least one pull switch 60, and a control box 70. The housing 30 internally defines a receiving space 31, which has a front open end 311. The driving motor 41 is fixedly assembled to the front open end 311 of the receiving space 31 and has a first rotary shaft 411. The rotary blade assembly 50 is assembled to the first rotary shaft 411. The pull switch 60 includes a selector (not shown) mounted in the receiving space 31 of the housing 30, and an actuator 61 having an end connected to the selector and another opposite end outwardly extended through and hung from the housing 30 by a predetermined length. The control box 70 is mounted in the receiving space 31 of the housing 30 and is electrically connected to the driving motor 41 and every pull switch 60.

Figure 1:
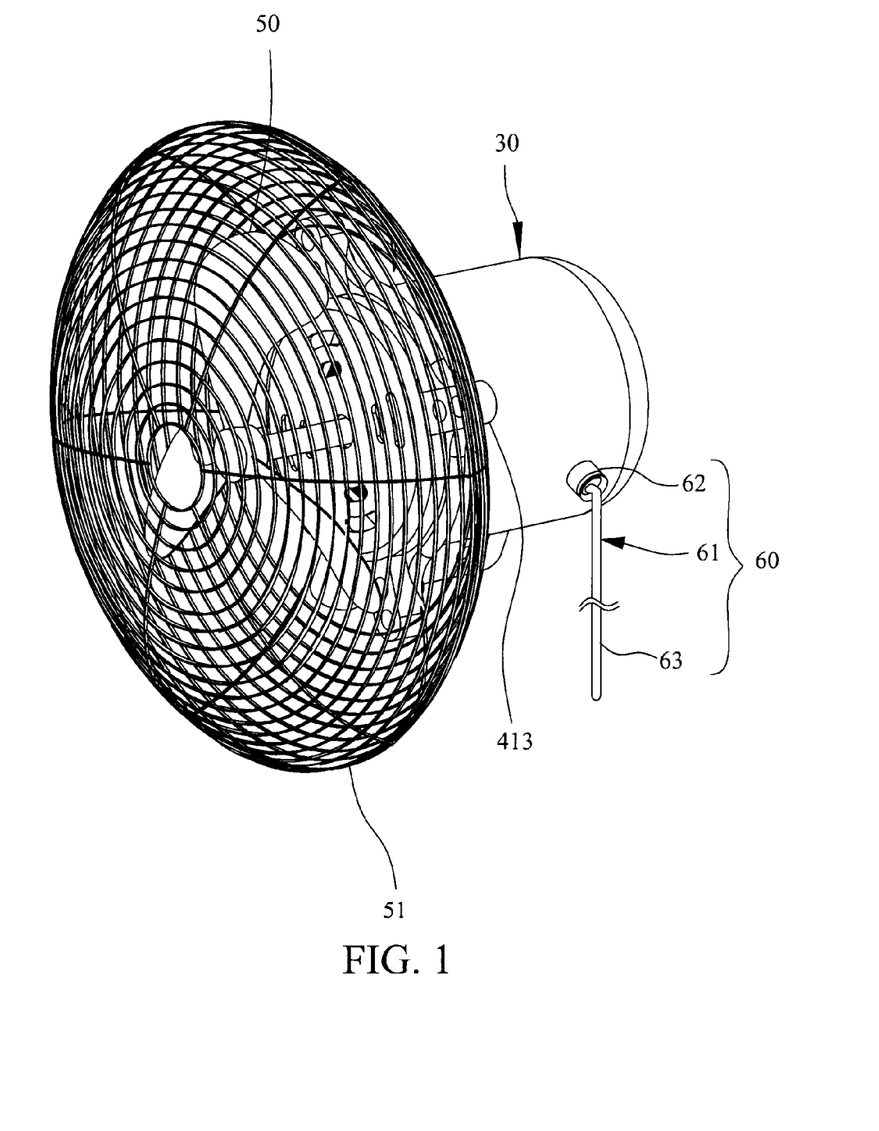
FIG. 1 is an assembled perspective view of an oscillating fan with built-in pull-type control switch according to the present invention, showing a rotary blade assembly and an actuator thereof.
Figure 2:
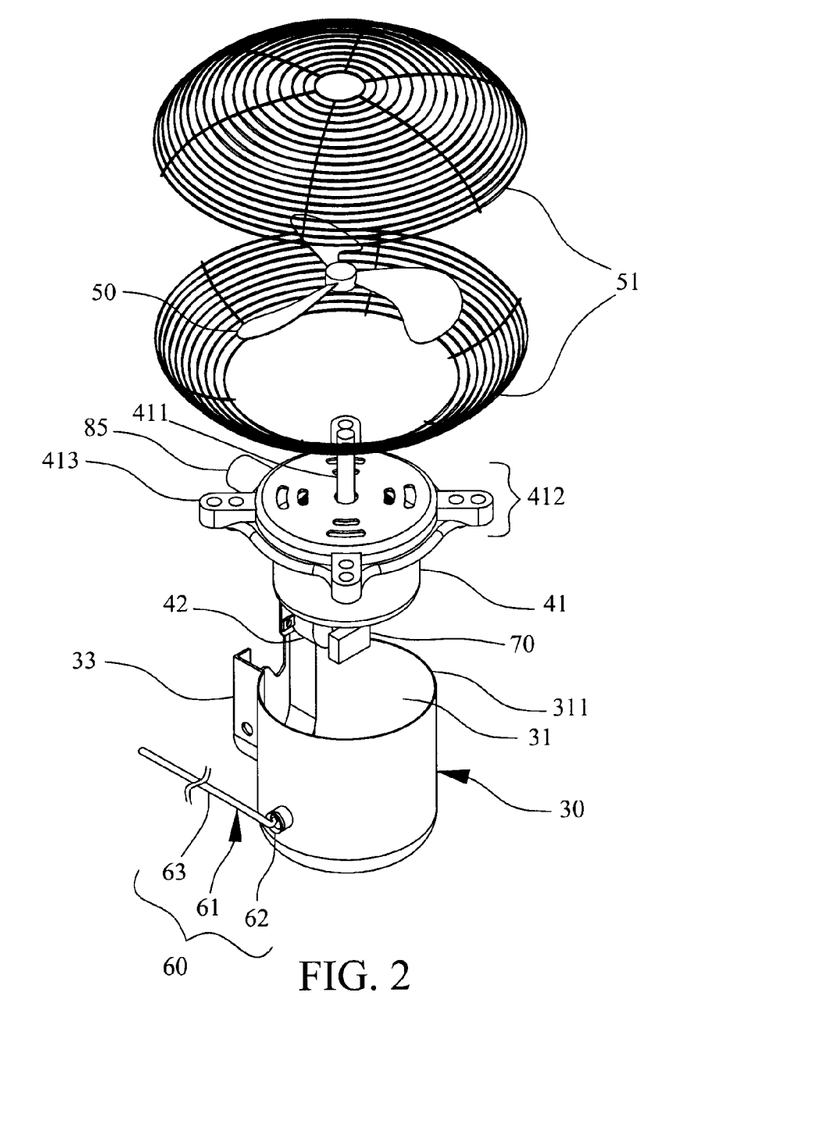
FIG. 2 is an exploded view of FIG. 1.

Please refer to FIG. 2. A partial volume 412 of a front end of the driving motor 41 and the first rotary shaft 411 are located outside and in front of the front open end 311 of the housing 30. A plurality of fixing arms 413 is radially outward extended from the front end of the driving motor 41 for a fan hood 51 to assemble thereto. The fan hood 51 encloses the whole rotary blade assembly 50 therein to protect the same.

Figure 3:
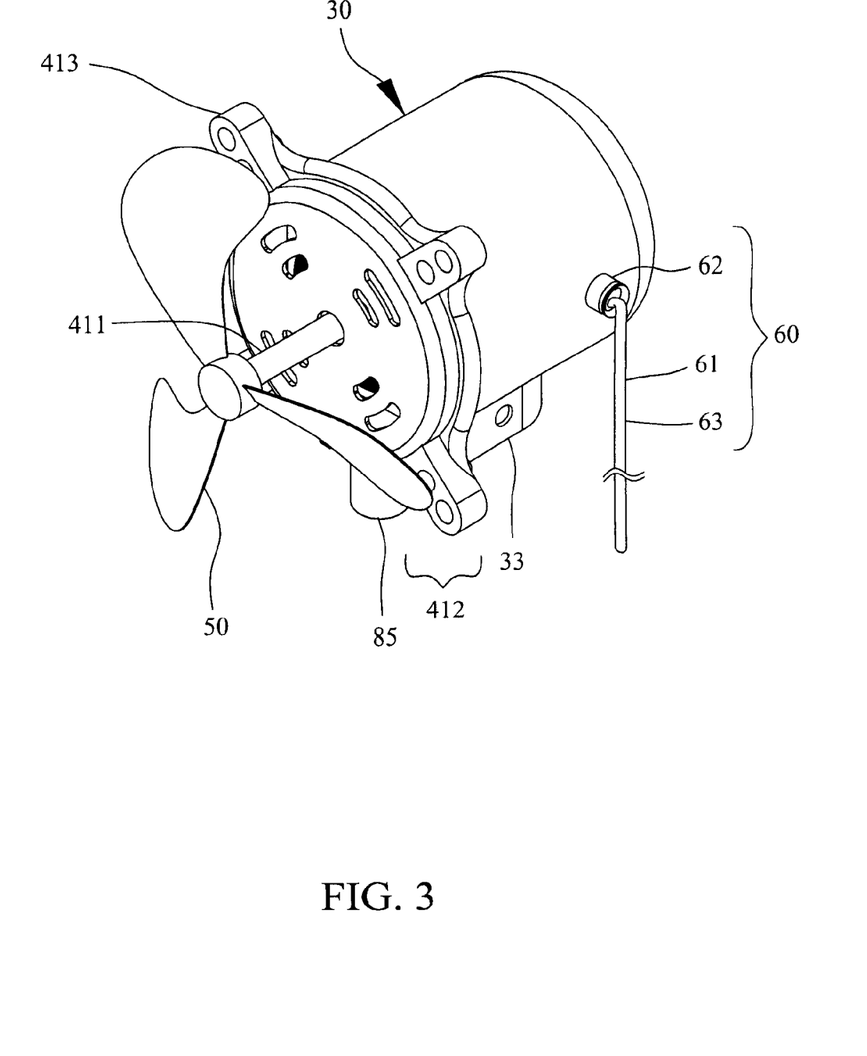
FIG. 3 is an assembled perspective view of the oscillating fan of the present invention with a fan hood removed therefrom.
Figure 4A:
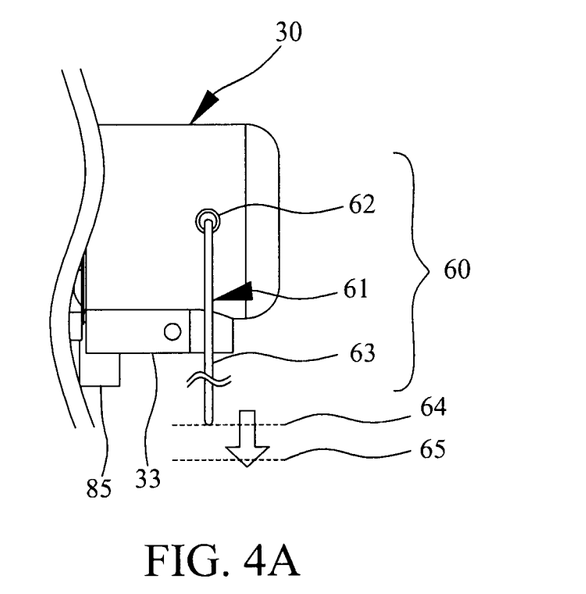
FIGS. 4A and 4B show the actuator for the built-in pull-type control switch of the oscillating fan of the present invention is pulled from a stable position to a switching position.
Figure 4B:
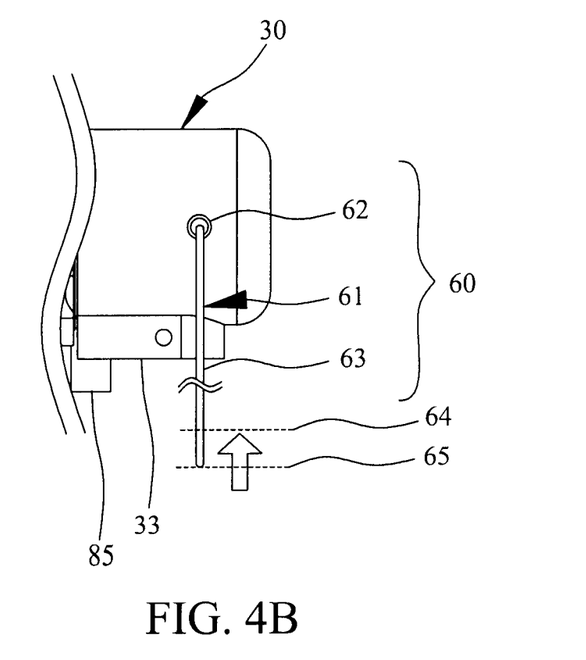

Please refer to FIG. 3 that is an assembled perspective view of the oscillating fan of the present invention with the fan hood 51 removed therefrom; and to FIGS. 4A and 4B that show the manner of operating the actuator 61. The actuator 61 has a round hollow post 62 fixedly attached to an outer side of the housing 30, and a pull string 63 having an end extended through the round hollow post 62 into the housing 30 to connect to the selector. Further, the actuator 61 cooperates with the selector to limitedly move between a stable position 64 and a switching position 65. When the pull string 63 of the actuator 61 is downward pulled from the stable position 64 to the switching position 65, the actuator 61 will actuate the selector. Then, the pull string 63 of the actuator 61 will automatically return to the stable position, so that a means for repetitive control is formed.

Figure 5:
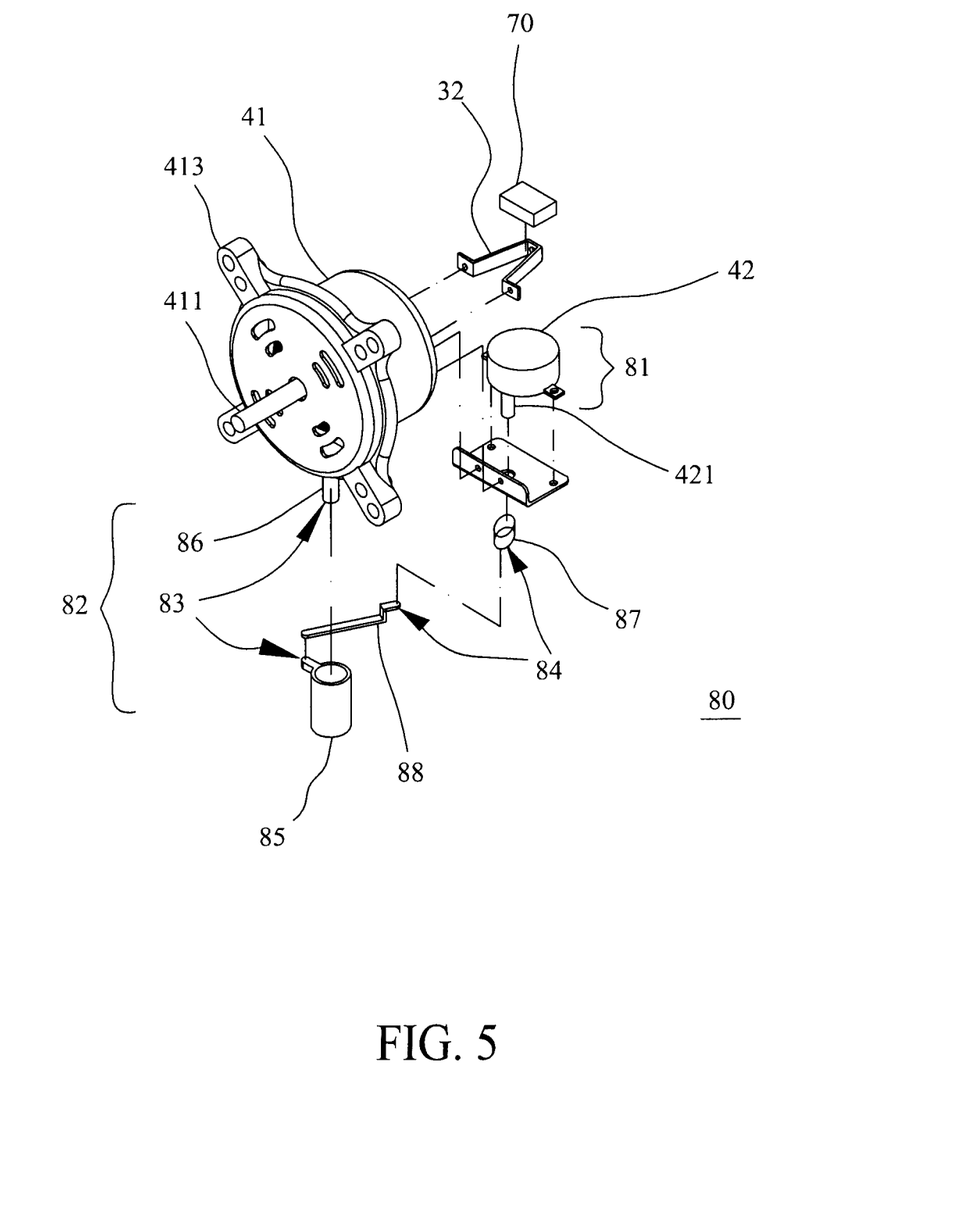
FIG. 5 is an exploded perspective view showing an oscillating mechanism for the oscillating fan of the present invention.
Figure 6:
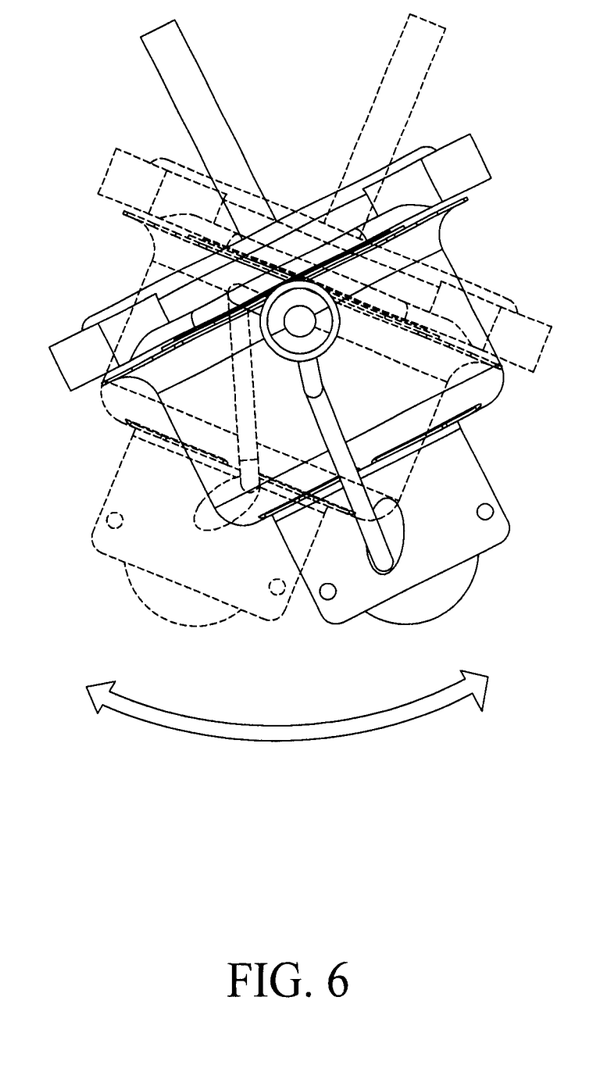
FIG. 6 shows the manner in which the oscillating mechanism for the oscillating fan of the present invention operates to drive the fan to oscillate.

FIG. 5 is an exploded perspective view showing an oscillating mechanism 80 for the oscillating fan of the present invention; and FIG. 6 shows the manner in which the oscillating mechanism 80 for the oscillating fan of the present invention operates to drive the fan to oscillate. Please refer to FIGS. 5 and 6. The oscillating mechanism 80 is provided in the receiving space 31 of the housing 30, and includes a driving end 81 connected to the driving motor 41 and an oscillating end 82 driven by the driving end 81 to oscillate. The driving end 81 includes a pivot motor 42 that is connected to a rear end of the driving motor 41 and has a second rotary shaft 421 extended therefrom. The oscillating end 82 includes a pivoting member 83 connected to an underside of the driving motor 41 and an interconnecting member 84 connected to between the pivoting member 83 and the second rotary shaft 421.

The pivoting member 83 has a fixing shaft 85 and a movable shaft 86 connected to the driving motor 41 and rotatably received in the fixing shaft 85. The interconnecting member 84 includes a pivoting block 87 connected to the second rotary shaft 421 and an oscillating plate 88 connected to between the pivoting block 87 and the fixing shaft 85. When the pivot motor 42 is started, it brings the second rotary shaft 421 and the pivoting block 87 connected thereto to revolve at the same time, so that the oscillating plate 88 having an end movably connected to the pivoting block 87 is pushed by the second rotary shaft 421. The oscillating plate 88 pushed by the second rotary shaft 421 in turn pushes the fixing shaft 85 movably connected to another end of the oscillating plate 88. Meanwhile, the fixing shaft 85 is limited by the movable shaft 86 to reciprocatingly rotate from side to side within a range about 90 degrees. The control box 70 is connected to a rear end of the driving motor 41 via a V-shaped connecting member 32.

Figure 7:
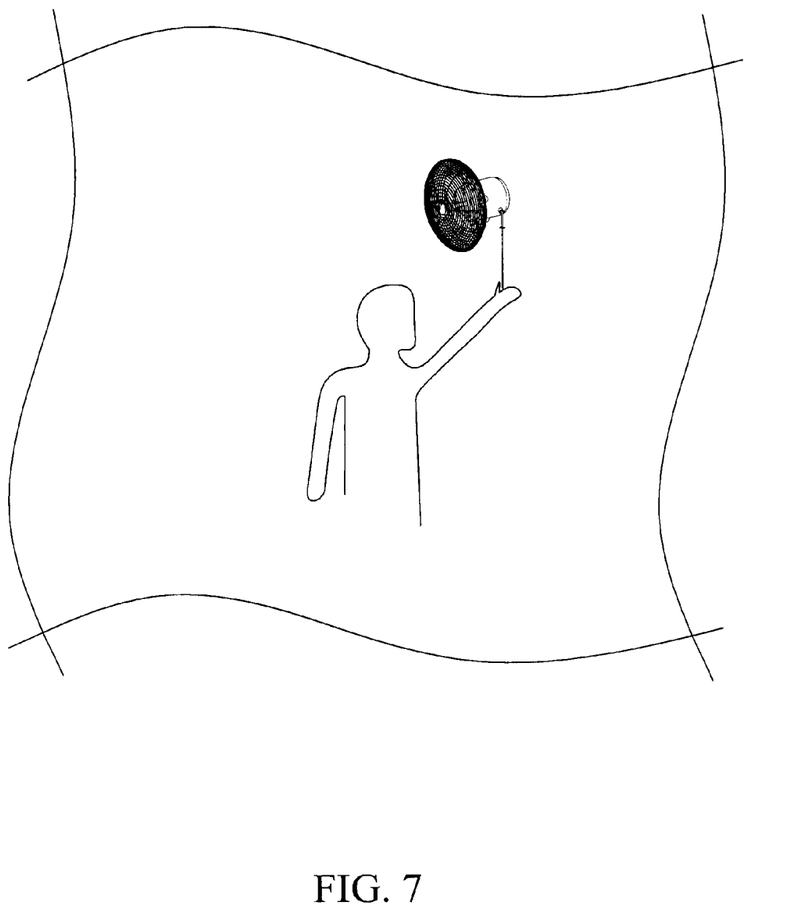
FIG. 7 schematically shows the oscillating fan of the present invention mounted on a wall can be conveniently controlled by a user to oscillate or not by pulling the actuator thereof.

Please refer to FIG. 7. When the oscillating fan is mounted on a wall, a ceiling or other relatively high position that could not be reached simply by a hand, the user may pull the pull string of the pull switch hung from the housing of the oscillating fan for controlling the oscillation of the fan. Therefore, the oscillating fan provides largely increased convenience in use of it. Moreover, with the oscillating fan according to the present invention, different components, including the pull switch, the driving motor, the control box and the oscillating mechanism, all are integrated in the housing to largely reduce an overall volume of the oscillating fan, so that the oscillating fan does not occupy too much space while having a beautiful appearance and being convenient for use.

The present invention has been described with a preferred embodiment thereof and it is understood that many changes and modifications in the described embodiment can be carried out without departing from the scope and the spirit of the invention that is intended to be limited only by the appended claims.

What is claimed is:

1. An oscillating fan with built-in pull-type control switch, comprising:
   a housing internally defining a receiving space, the receiving space having a front open end;
   a driving motor fixedly assembled to the front open end of the receiving space of the housing, and having a first rotary shaft forward projected from a front end thereof;
   a rotary blade assembly assembled to the first rotary shaft;
   at least one pull switch including a selector mounted inside the housing, and an actuator having an end connected to the selector and another opposite end outwardly extended through and hung from the housing by a predetermined length;
   a control box mounted in the receiving space of the housing and electrically connected to the driving motor and every pull switch; and
   an oscillating mechanism mounted inside the housing to cause said driving motor and said housing to oscillate together, and having:
   a driving end connected to the driving motor, and including:
     a pivot motor connected to a rear end of the driving motor, the pivot motor having a second rotary shaft extending therefrom; and
   an oscillating end driven by the driving end to oscillate, and including:
     a pivoting member connected to an underside of the driving motor and including a fixing shaft that has a portion extending outside of the receiving space, and a movable shaft rotatably received in the fixing shaft, the movable shaft extending from a bottom of the driving motor and an interconnecting member having one end connected to the fixing shaft and another end connected to the second rotary shaft.

2. The oscillating fan with built-in pull-type control switch as claimed in claim 1, wherein a partial volume of the front end of the driving motor and the first rotary shaft are located outside and in front of the front open end of the housing.

3. The oscillating fan with built-in pull-type control switch as claimed in claim 1, wherein a plurality of fixing arms is radially outward extended from the front end of the driving motor for a fan hood to assemble thereto; and the fan hood enclosing the whole rotary blade assembly.

4. The oscillating fan with built-in pull-type control switch as claimed in claim 1, wherein the actuator cooperates with the selector to limitedly move between a stable position and a switching position to thereby form a controlling and switching means.

5. The oscillating fan with built-in pull-type control switch as claimed in claim 4, wherein the actuator has a round hollow post fixedly attached to an outer side of the housing, and a pull string extended through the round hollow post into the housing to connect to the selector.

6. The oscillating fan with built-in pull-type control switch as claimed in claim 1, wherein the interconnecting member includes a pivoting block connected to the second rotary shaft and an oscillating plate connected to between the pivoting block and the fixing shaft.

7. The oscillating fan with built-in pull-type control switch as claimed in claim 1, wherein the control box is connected to a rear end of the driving motor via a V-shaped connecting member.

\* \* \* \* \*